United States Patent
Kotani et al.

[11] Patent Number: 5,916,511
[45] Date of Patent: Jun. 29, 1999

[54] PRODUCTION METHOD OF CORDIERITE CERAMIC HONEYCOMB STRUCTURE

[75] Inventors: Wataru Kotani, Kasugai; Kyoko Makino, Nagoya, both of Japan

[73] Assignee: NGK Insulators, Ltd., Japan

[21] Appl. No.: 09/132,519

[22] Filed: Aug. 11, 1998

[30] Foreign Application Priority Data

Aug. 19, 1997 [JP] Japan .................................. 9-222355

[51] Int. Cl.⁶ .................................................. C04B 33/04
[52] U.S. Cl. ................... 264/631; 264/630; 264/177.11; 264/177.12
[58] Field of Search .................................. 264/630, 631, 264/177.12, 177.11

[56] References Cited

U.S. PATENT DOCUMENTS

| | | | |
|---|---|---|---|
| 4,001,028 | 1/1977 | Frost et al. | 106/62 |
| 5,030,398 | 7/1991 | Hamanaka et al. | 264/631 |
| 5,387,564 | 2/1995 | Takeuchi et al. | 264/177.12 |
| 5,518,678 | 5/1996 | Miyamoto et al. | 264/177.12 |

FOREIGN PATENT DOCUMENTS

| | | |
|---|---|---|
| 0 421 391 A1 | 4/1991 | European Pat. Off. . |
| 51-5313 | 1/1976 | Japan . |
| 56-145171 | 11/1981 | Japan . |

*Primary Examiner*—James Derrington
*Attorney, Agent, or Firm*—Parkhurst & Wendel, L.L.P.

[57] ABSTRACT

A production method of a cordierite ceramic honeycomb structure is provided. Clay mineral, which is one component in the cordierite material batch for extruding, contains dickite and at least one selected from the group consisting of kaolinite and halloysite, with a 5 to 50% by weight dickite amount in the clay mineral. The honeycomb structure has a thin partition wall, and is suitable for the mass production by improving the formability (in particular, the lubricity and the shape stability) in extruding and by preventing crack generation in the firing process.

4 Claims, No Drawings

PRODUCTION METHOD OF CORDIERITE CERAMIC HONEYCOMB STRUCTURE

BACKGROUND OF THE INVENTION

1. Field of the Invention

The present invention relates to a method for producing a cordierite ceramic honeycomb structure by extruding.

2. Description of Related Art

Cordierite ceramic honeycomb structures are used as an exhaust gas purifying catalyst carrier, a filter, or a heat exchanger for automobiles or the industrial use.

Conventionally, a production method of a cordierite ceramic substrate disclosed in Japanese Patent Application Laid-Open No. 51-5313 mentions that the firing process can be conducted economically without generating a crack while maintaining characteristics necessary for a honeycomb substrate by reducing the amount of unprocessed clay (raw clay) included in the clay component in the material batch and replacing the same by processed clay (calcined clay) in preparing clay, talc and alumina materials for producing a honeycomb substrate having a cordierite phase as the main component.

Further, Japanese Patent Application Laid-Open No. 56-145171 discloses a technology for producing a cordierite body having the excellent thermal impact resistance, capable of conducting the firing process at a comparatively low temperature by using halloysite as the kaolin mineral and plate-like talc particles as the talc.

However, recently, a thinner wall and a higher cell density are desired particularly for a honeycomb carrier of a ceramic honeycomb catalyst carrier to be used for an exhaust gas apparatus for automobiles in order to improve the purifying performance according to the progress of the industrial technology.

In general, a cordierite ceramic honeycomb structure is produced by extruding in order to improve the mass productivity.

Therefore, in order to have a thinner wall and a higher cell density in the honeycomb carrier, it is important to improve the formability at the time of extruding.

In consideration of the point, the method of replacing the raw clay by the calcined clay disclosed in Japanese Patent Application Laid-Open No. 51-5313 remarkably deteriorates the formability at the time of extruding although the method is effective for reducing crack generation at the time of firing. Further, the method using halloysite disclosed in Japanese Patent Application Laid-Open No. 56-145171 can improve only the thermal impact resistance but the improvement in the formability in production cannot be expected.

SUMMARY OF THE INVENTION

Accordingly, in order to cope with the above-mentioned conventional problems, an object of the present invention is to provide a production method of a cordierite ceramic honeycomb structure, capable of coping with a honeycomb structure with a thin partition wall by improving the formability (in particular, the lubricity and the shape stability) and preventing generation of a crack in the firing process, and thus suitable for the mass production in extruding.

According to the present invention, there is provided a production method of a cordierite ceramic honeycomb structure having cordierite as the main component of the crystalline phase, which comprises: adding a forming auxiliary agent to a cordierite material to obtain a mixture, kneading the mixture to obtain a material batch, forming the material batch by extrusion to form a honeycomb structure, drying the honeycomb structure to obtain a dried body, and firing the dried body, wherein clay mineral, which is one component in the cordierite material batch for extruding, contains dickite and at least one selected from the group consisting of kaolinite and halloysite, with a 5 to 50% by weight dickite amount in the clay mineral.

According to the present invention, it is preferable that the average particle size of the dickite in the clay mineral is 10 $\mu$m or less, and extrusion dies with a 110 $\mu$m or less slit width are used.

According to the present invention, it is further preferable that the coefficient of thermal expansion between 40 to 800° C. of the cordierite ceramic honeycomb structure in the direction to the flow passages is $0.8\times10^{-6}$/° C. or less.

DESCRIPTION OF THE PREFERRED EMBODIMENTS

In a production method of a cordierite ceramic honeycomb structure according to the present invention, clay mineral, which is one component in the cordierite material batch for extruding, contains dickite and at least one selected from the group consisting of kaolinite and halloysite, with a 5 to 50% by weight dickite amount in the clay mineral.

Accordingly, since the formability (in particular, the lubricity and the shape stability), which has not been realized with kaolinite, halloysite or a combination thereof, can be improved as well as crack generation can be prevented in the firing process, a honeycomb structure with a thin partition wall having a 110 $\mu$m or less slit width, suitable for mass production, can be obtained.

However, since dickite is not good in terms of the sintering reaction in the firing process compared with kaolinite and halloysite, the coefficient of thermal expansion rises so that the thermal shock resistance and the isostatic strength (hydrostatic pressure fracture strength) of the honeycomb structure after firing can be deteriorated.

Therefore, in order to maximize dickite characteristics, it is important to use the dickite such that the weak point of the dickite can be compensated by characteristics of kaolinite and halloysite.

In consideration of the above-mentioned, the amount of the dickite in the clay mineral is 5 to 50% by weight in a production method of a cordierite ceramic honeycomb structure of the present invention.

The reason thereof is that the chance of crack (firing tear) generation in the firing process is increased and the formability is deteriorated with a less than 5% by weight dickite amount in the clay mineral.

On the other hand, with a more than 50% by weight amount, since the sintering reaction of the dickite in the firing process is not good, the coefficient of thermal expansion rises and the thermal shock resistance of the honeycomb structure after firing is declined.

In a production method of a cordierite ceramic honeycomb structure of the present invention, the average particle size of dickite in the clay mineral is preferably 10 $\mu$m or less, more preferably 7 $\mu$m or less in order to improve the poor sintering reaction of the dickite in the firing process.

Furthermore, it is preferable that the coefficient of thermal expansion between 40 to 800° C. of the cordierite ceramic honeycomb structure obtained in the present invention in the direction to the flow passages is $0.8\times10^{-6}$/° C. or less.

This is because the structure cannot endure in the use for an exhaust gas catalyst carrier since the thermal shock resistance [Esp] becomes lower than 700° C. with a coefficient of thermal expansion [CTE] (the direction to the flow passages of the honeycomb sintered compact) exceeding $0.8\times10^{-6}/°$ C.

The coefficient of thermal expansion (between 40 to 800° C.) in the vertical direction to the flow passages is preferably $1.0\times10^{-5}/°$ C. or less for the reason the same as the above-mentioned.

The present invention will be explained in further detail with reference to examples, but the present invention is not limited thereto.

The performance of the cordierite materials, the honeycomb compacts and the honeycomb sintered bodies obtained in the examples was evaluated by the method mentioned below.

Measuring Method for the Particle Size

The particle size was measured with Sedigraph (X-ray sedimentation method) produced by Micromeritech Corp.

Measuring Method for the Chemical Analysis Value

The chemical analysis value was measured by the fluorescent X-ray spectroscopy.

Measuring Method for the Thermal Shock Resistance [Esp]

Whether or not a honeycomb structure (honeycomb sintered body) of a room temperature placed in an electric furnace, maintained for 30 minutes, and taken out to the room temperature has a fracture was measured by the hammering judgment (with 50° C. interval from 600° C., the safe temperature [° C.] is shown).

Measuring Method for the Isostatic Strength [ISO]

With a honeycomb structure (honeycomb sitered body) inserted in a flexible tube, the pressure ($kg/cm^2$) at which partial breakage was generated by applying a uniform hydraulic pressure was measured (average value of 10 specimens).

EXAMPLES 1 to 10, COMPARATIVE EXAMPLES 1 to 8

As the cordierite material, unbaked clay for extruding was prepared such that a cordierite composition can be provided after firing each batch, with chemical analysis values, talc, unprocessed clays (kaolinite, dickite, and halloysite), calcined clay, alumina, aluminum hydroxide, and silica shown in Table 1, with the ratio of the unprocessed clay changed as shown in Table 2, by adding methyl cellulose and an organic forming auxiliary agent, and kneading.

With each unbaked clay, a cylindrical honeycomb structure (honeycomb compact) with a 100 mm diameter and a 150 mm height, having a square cell shape with a 76 μm rib thickness and a 62 pieces/$cm^2$ cell number was formed by a known extruding method.

The formability thereof was evaluated by the lubricity (extrusion pressure for obtaining a constant forming speed) and the shape stability (stress for crushing a honeycomb structure from the above immediately after extrusion).

Furthermore, a honeycomb sintered body (honeycomb structure) was produced by drying the honeycomb compact (honeycomb structure) and firing with a 1420° C. firing maximum temperature for 35 hours (economical firing time), and the ratio of the firing tear (crack), the coefficient of thermal expansion [CTE] (the direction to the flow passages of the honeycomb sintered body), the thermal shock resistance [Esp], and the isostatic strength [ISO] were measured. Results are shown in Table 2.

TABLE 1

| Material | | Average particle size (μm) | Chemical analysis value (%) | | | | | | |
|---|---|---|---|---|---|---|---|---|---|
| | | | Igloss | $SiO_2$ | $Al_2O_3$ | MgO | $TiO_2$ | $Fe_2O_3$ | CaO + $Na_2O$ + $K_2O$ |
| Talc | | 4.5 | 5.7 | 60.9 | 1.2 | 30.8 | — | 1.0 | 0.3 |
| Clay mineral | Kaolinite | 0.4 | 13.8 | 45.4 | 38.6 | — | 1.5 | 0.5 | 0.2 |
| | Dickite | 6.2 | 14.5 | 43.6 | 41.0 | — | 0.2 | 0.5 | 0.6 |
| | Halloysite | 0.4 | 13.5 | 49.5 | 36.0 | — | 0.1 | 0.2 | 0.1 |
| Calcined clay | | 1.4 | 0.1 | 52.5 | 45.0 | — | 1.0 | 0.3 | 0.2 |
| Alumina | | 4.5 | 0.3 | — | 99.4 | — | — | — | — |
| Aluminum hydroxide | | 0.9 | 34.3 | — | 65.7 | — | — | — | — |
| Silica | | 3.8 | 0.1 | 99.5 | 0.4 | — | — | — | — |

TABLE 2

| | Ratio in the entire clay mineral (%) | | | Moldability evaluation | | | Honeycomb characteristics | | | |
| | | | | Flowability (kgf) | Shape retention (kgf) | Comprehensive judgment | Ratio of firing tear (%) | CTE ($\times10^{-6}/°$ C.) | Esp (° C.) | ISO ($kg/cm^2$) |
|---|---|---|---|---|---|---|---|---|---|---|
| | Kaolinite | Halloysite | Dickite | | | | | | | |
| Example 1 | 95 | 0 | 5 | 18 | 3.7 | ○ | 0 | 0.55 | 850 | 18.5 |
| Example 2 | 75 | 0 | 25 | 15 | 4.2 | ◎ | 0 | 0.71 | 750 | 20.6 |
| Example 3 | 50 | 0 | 50 | 14 | 4.5 | ◎ | 0 | 0.78 | 750 | 22.4 |
| Example 4 | 0 | 95 | 5 | 20 | 2.1 | ○ | 0 | 0.57 | 850 | 10.8 |
| Example 5 | 0 | 75 | 25 | 21 | 2.3 | ○ | 0 | 0.75 | 750 | 11.1 |
| Example 6 | 0 | 50 | 50 | 21 | 2.5 | ○ | 0 | 0.77 | 750 | 12.0 |
| Example 7 | 20 | 75 | 5 | 18 | 2.7 | ○ | 0 | 0.62 | 800 | 13.8 |
| Example 8 | 75 | 20 | 5 | 16 | 3.2 | ○ | 0 | 0.58 | 800 | 16.5 |
| Example 9 | 10 | 40 | 50 | 13 | 4.0 | ◎ | 0 | 0.80 | 700 | 21.0 |
| Example 10 | 40 | 10 | 50 | 12 | 4.2 | ◎ | 0 | 0.79 | 700 | 22.3 |

TABLE 2-continued

|  | Ratio in the entire clay mineral (%) | | | Moldability evaluation | | | Honeycomb characteristics after firing | | | |
|---|---|---|---|---|---|---|---|---|---|---|
|  | | | | Flowability (kgf) | Shape retention (kgf) | Comprehensive judgment | Ratio of firing tear (%) | CTE (×10⁻⁶/° C.) | Esp (° C.) | ISO (kg/cm²) |
|  | Kaolinite | Halloysite | Dickite | | | | | | | |
| Comparative example 1 | 100 | 0 | 0 | 15 | 2.5 | ◯ | 50 | 0.46 | 900 | 14.2 |
| Comparative example 2 | 0 | 100 | 0 | 17 | 1.0 | Δ | 70 | 0.50 | 850 | 6.9 |
| Comparative example 3 | 97 | 0 | 3 | 18 | 3.6 | ◯ | 15 | 0.53 | 850 | 17.6 |
| Comparative example 4 | 45 | 0 | 55 | 16 | 4.7 | ⊚ | 0 | 0.90 | 650 | 23.6 |
| Comparative example 5 | 0 | 97 | 3 | 20 | 1.8 | Δ | 45 | 0.52 | 850 | 8.9 |
| Comparative example 6 | 0 | 45 | 55 | 22 | 2.8 | ◯ | 0 | 0.93 | 650 | 13.1 |
| Comparative example 7 | 57 | 40 | 3 | 19 | 3.2 | ◯ | 40 | 0.50 | 850 | 14.7 |
| Comparative example 8 | 20 | 25 | 55 | 18 | 4.5 | ⊚ | 0 | 0.98 | 650 | 20.8 |

⊚: Excellent
◯: Good
Δ: Inferior

Discussion: Examples 1 to 10, Comparative Examples 1 to 8

From the results shown in Table 2, it was learned that the ratio of generating firing tear was higher and the formability is poor in Comparative Examples 1 to 2 due to the absence of dickite.

Further, since the dickite amount is too small in Comparative Examples 3, 5, and 7, the ratio of generating firing tear cannot be 0%.

Moreover, since the dickite amount is too large in Comparative Examples 4, 6 and 8, the coefficient of thermal expansion [CTE] rises so that the thermal shock resistance [Esp] is deteriorated. The reason thereof can be considered that the coefficient of thermal expansion [CTE] is raised due to a high crystalline property of dickite so as to bring about a poor reactivity in the cordierite reaction process.

It was learned that the isostatic strength [ISO] of the honeycomb characteristics becomes poor since the formability becomes slightly poor when halloysite is used in place of kaolinite.

On the other hand, since the dickite amount was appropriate (the dickite amount in the clay mineral was 5 to 50% by weight) in Examples 1 to 10, the ratio of generating firing tear was 0% as well as the formability and the honeycomb characteristics were also good.

Further, it was learned that since the coefficient of thermal expansion [CTE] (the direction to the flow passages of the honeycomb sintered body) was $0.8 \times 10^{-6}$/° C. or less, the thermal shock resistance [Esp] becomes 700° C. or more so that it can be used as an exhaust gas catalyst carrier for automobiles.

Examples 11 to 12, Comparative Example 9

As the cordierite material, unbaked clay for extrusion molding was prepared such that a cordierite composition can be provided after firing each batch, with chemical analysis values, talc, unprocessed clays (kaolinite and dickite), calcined clay, alumina, aluminum hydroxide, and silica shown in Table 3, with the ratio of the unprocessed clay changed as shown in Table 4, by adding methyl cellulose and an organic forming auxiliary agent, and kneading.

With each unbaked clay, a cylindrical honeycomb structure (honeycomb compact) with a 100 mm diameter and a 150 mm height, having a square cell shape with a 76 μm rib thickness and a 62 pieces/cm² cell number was formed by a known extruding method.

The formability thereof was evaluated by the flowability (extrusion pressure for obtaining a constant forming speed) and the shape stability (stress for crushing a honeycomb structure from the above immediately after extrusion).

Furthermore, a honeycomb sintered body (honeycomb structure) was produced by drying the honeycomb compact (honeycomb structure) and firing with a 1420° C. firing maximum temperature for 35 hours (economical firing time), and the ratio of the firing tear (crack), the coefficient of thermal expansion [CTE] (the direction to the flow passages of the honeycomb sintered body), the thermal shock resistance [Esp], and the isostatic strength [ISO] were measured. Results are shown in Table 4.

TABLE 3

| Material | | Average particle size (μm) | Chemical analysis value (%) | | | | | | |
|---|---|---|---|---|---|---|---|---|---|
| | | | Igloss | SiO₂ | Al₂O₃ | MgO | TiO₂ | Fe₂O₃ | CaO + Na₂O + K₂O |
| Talc | | 4.5 | 5.7 | 60.9 | 1.2 | 30.8 | — | 1.0 | 0.3 |
| Clay mineral | Kaolinite | 0.4 | 13.8 | 45.4 | 38.6 | — | 1.5 | 0.5 | 0.2 |
| | Dickite A | 11.0 | 12.1 | 51.0 | 35.4 | — | 0.2 | 0.2 | 0.3 |
| | Dickite B | 6.2 | 13.8 | 49.0 | 35.8 | — | 0.2 | 0.2 | 0.3 |
| | Dickite C | 5.3 | 12.0 | 51.0 | 34.5 | — | 0.9 | 0.1 | 0.6 |
| Calcined clay | | 1.4 | 0.1 | 52.5 | 45.0 | — | 1.0 | 0.3 | 0.2 |
| Alumina | | 4.5 | 0.3 | — | 99.4 | — | — | — | — |
| Aluminum hydroxide | | 0.9 | 34.3 | — | 65.7 | — | — | — | — |
| Silica | | 3.8 | 0.1 | 99.5 | 0.4 | — | — | — | — |

TABLE 4

|  | Ratio in the entire clay mineral (%) | | Moldability evaluation | | | Ratio of firing tear (%) | Honeycomb characteristics after firing | | |
| --- | --- | --- | --- | --- | --- | --- | --- | --- | --- |
|  | Kaolinite | Dickite | Flowability (kgf) | Shape retention (kgf) | Comprehensive judgment |  | CTE (×10⁻⁶/° C.) | Exp (° C.) | ISO (kg/cm²) |
| Example 11 | 75 | Dickite C: 25 | 14 | 4.5 | ⊚ | 0 | 0.78 | 750 | 22.4 |
| Example 12 | 75 | Dickite B: 25 | 15 | 4.2 | ⊚ | 0 | 0.71 | 750 | 20.6 |
| Comparative example 9 | 75 | Dickite A: 25 | 18 | 3.7 | ○ | 0 | 1.02 | 600 | 18.5 |

⊚: Excellent
○: Good

Discussion: Examples 11 to 12, Comparative Example 9

From the results shown in Table 4, it was learned that the coefficient of thermal expansion [CTE] was raised due to the average particle size coarseness (over 10 μm) of the dickite A in Comparative Example 9 so that the thermal shock resistance [Esp] was declined, and thus it cannot be used as a catalyst carrier for automobiles.

On the other hand, since the dickite B and dickite C with an appropriate average particle size (10 μm or less) were used in Comparative Examples 11 to 12, the ratio of generating firing tear was 0% as well as the formability and the honeycomb characteristics were also good.

Further, it was learned that since the coefficient of thermal expansion [CTE] (the direction to the flow passages of the honeycomb sintered body) was 0.8×10⁻⁶/° C. or less, the thermal shock resistance [Esp] becomes 700° C. or more so that it can be used as an exhaust gas catalyst carrier for automobiles.

Further, since the dickite C containing a large amount of alkaline and alkaline earth was used in Example 11, the coefficient of thermal expansion [CTE] was slightly high.

As heretofore mentioned, according to a production method of a cordierite ceramic honeycomb structure of the present invention, a honeycomb structure having a thin partition wall, and suitable for the mass production can be obtained since the formability (in particular, the lubricity and the shape stability) can be improved in extruding and crack generation can be prevented in the firing process.

What is claimed is:

1. A production method of a cordierite ceramic honeycomb structure having cordierite as the main component of the crystalline phase, which comprises:
    adding a forming auxiliary agent to a cordierite forming material to obtain a mixture,
    kneading the mixture to obtain a material batch,
    forming the material batch by extrusion to form a honeycomb compact,
    drying the honeycomb compact to obtain a dried body, and
    firing the dried body,
    wherein clay mineral, which is one component in the cordierite forming material batch for extruding, contains dickite and at least one clay selected from the group consisting of kaolinite and halloysite, with a 5 to 50% by weight dickite amount in the clay mineral.

2. The production method of a cordierite ceramic honeycomb structure according to claim 1, wherein the average particle size of the dickite in the clay mineral is 10 μm or less.

3. The production method of a cordierite ceramic honeycomb structure according to claim 1, wherein extrusion dies with a 110 μm or less slit width are used.

4. The production method of a cordierite ceramic honeycomb structure according to claim 1, wherein the coefficient of thermal expansion between 40 to 800° C. of the cordierite ceramic honeycomb structure in the channel direction to the flow passages is 0.8×10⁻⁶/° C. or less.

* * * * *